(No Model.) 4 Sheets—Sheet 2.
C. P. HIGGINS.
END WELDING MACHINE FOR HEADERS OR OTHER TUBES.
No. 503,961. Patented Aug. 29, 1893.
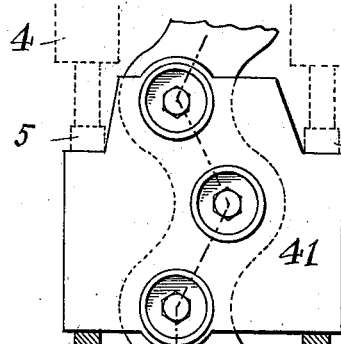
Fig. 4.
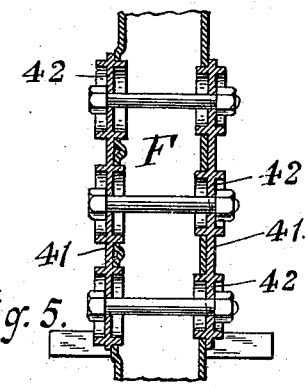
Fig. 5.
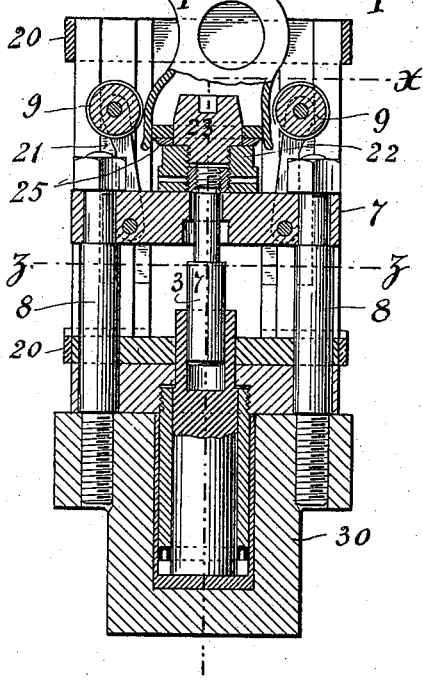
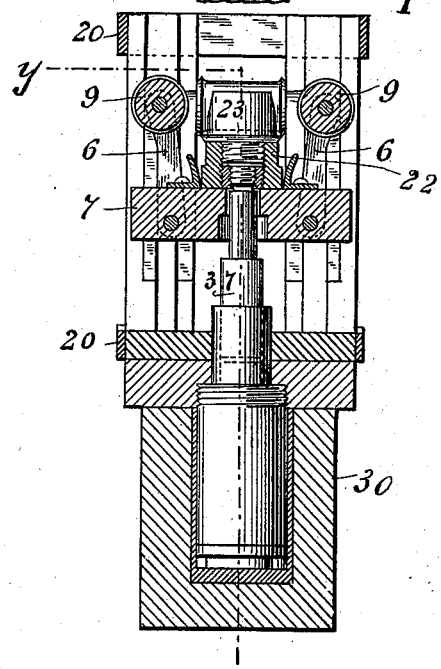
Fig. 9.
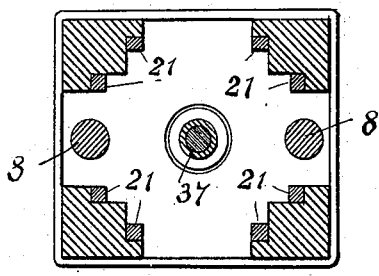
Fig. 10.
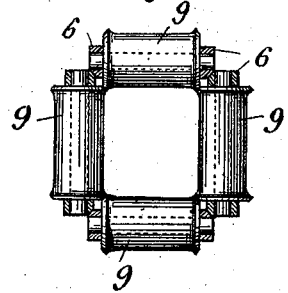
Witnesses
Chas Hanimann
N. Marlor
Inventor
Campbell P. Higgins
By his Attorney
Chas W. Jorlor (No Model.) 4 Sheets—Sheet 3.
C. P. HIGGINS.
END WELDING MACHINE FOR HEADERS OR OTHER TUBES.
No. 503,961. Patented Aug. 29, 1893.
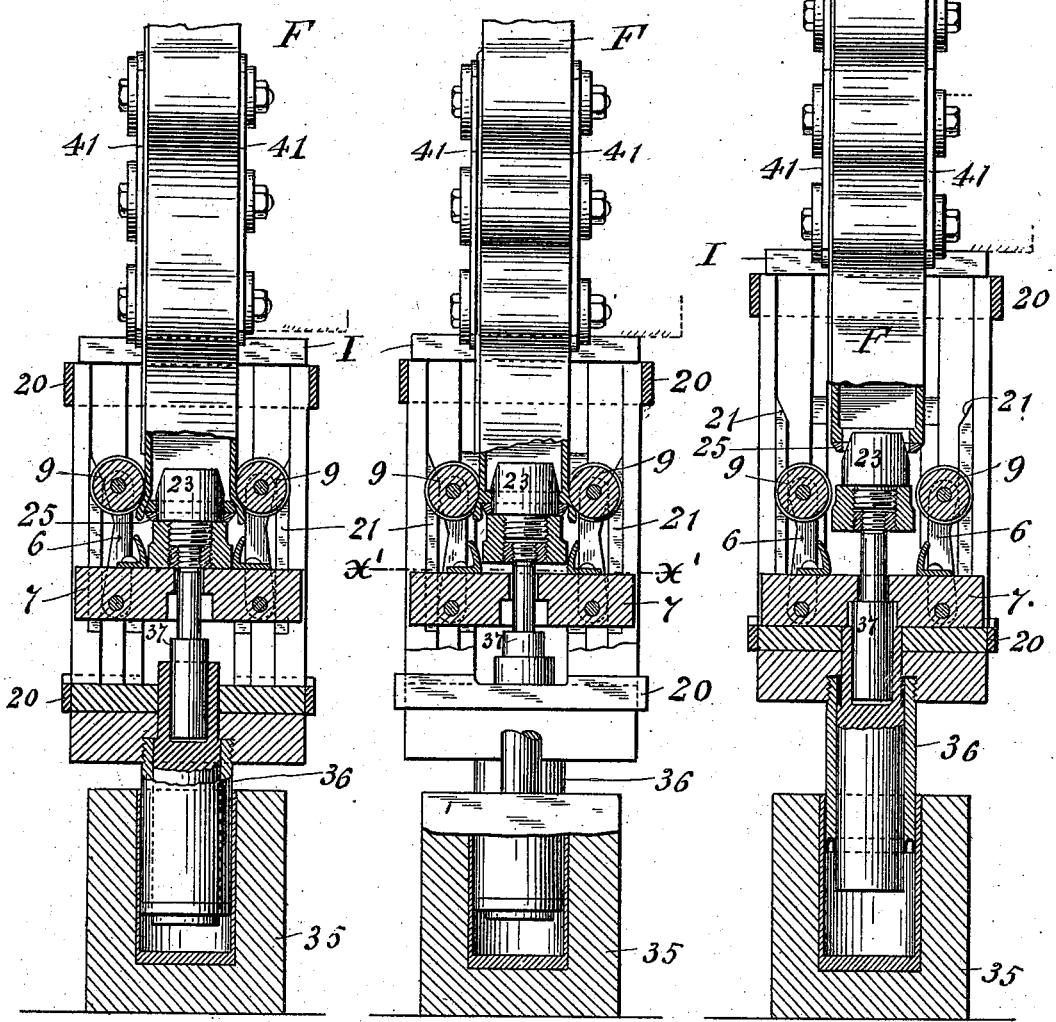
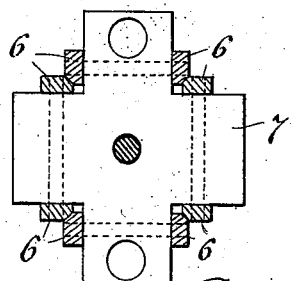

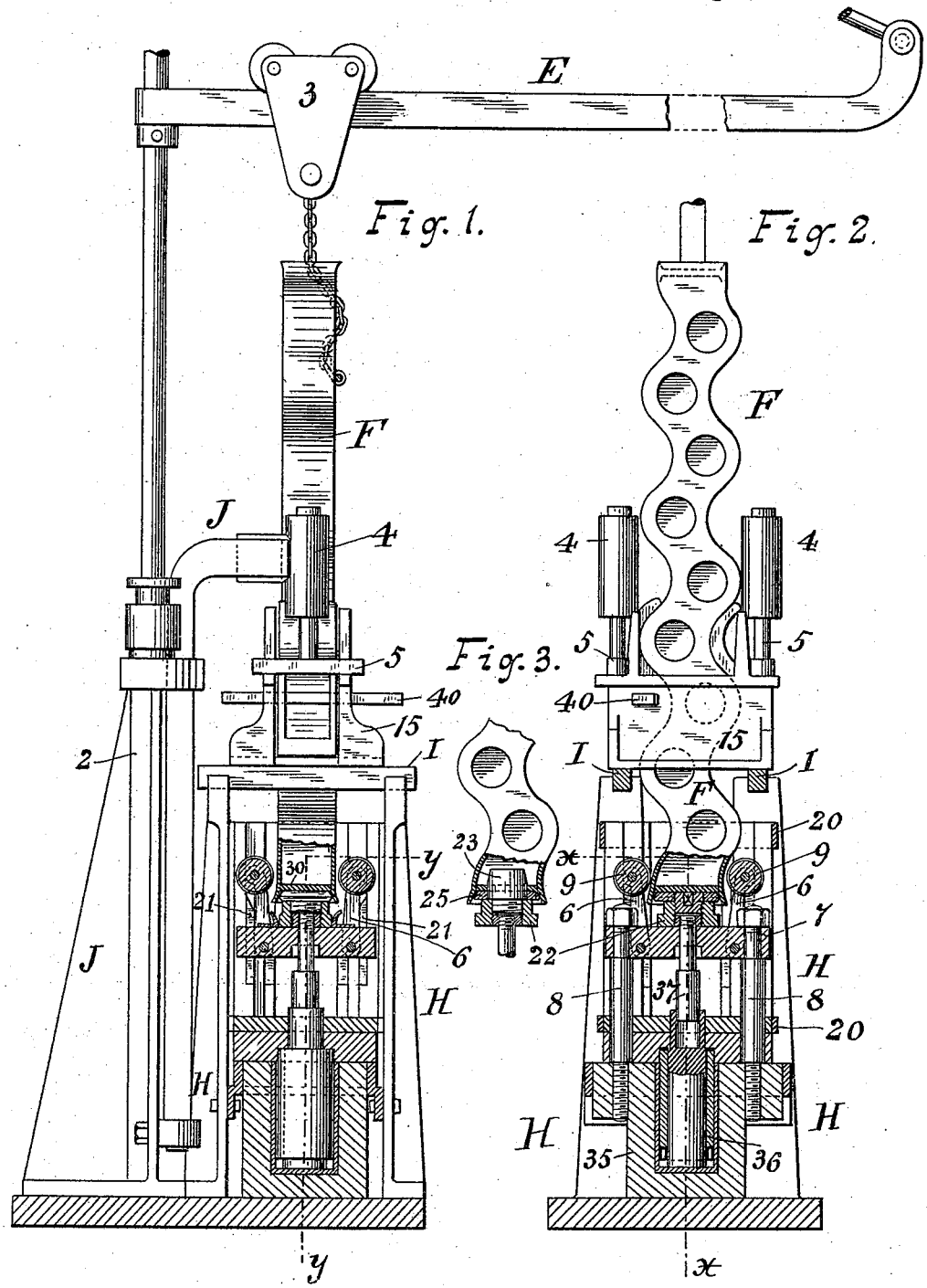

(No Model.) 4 Sheets—Sheet 4.
C. P. HIGGINS.
END WELDING MACHINE FOR HEADERS OR OTHER TUBES.
No. 503,961. Patented Aug. 29, 1893.
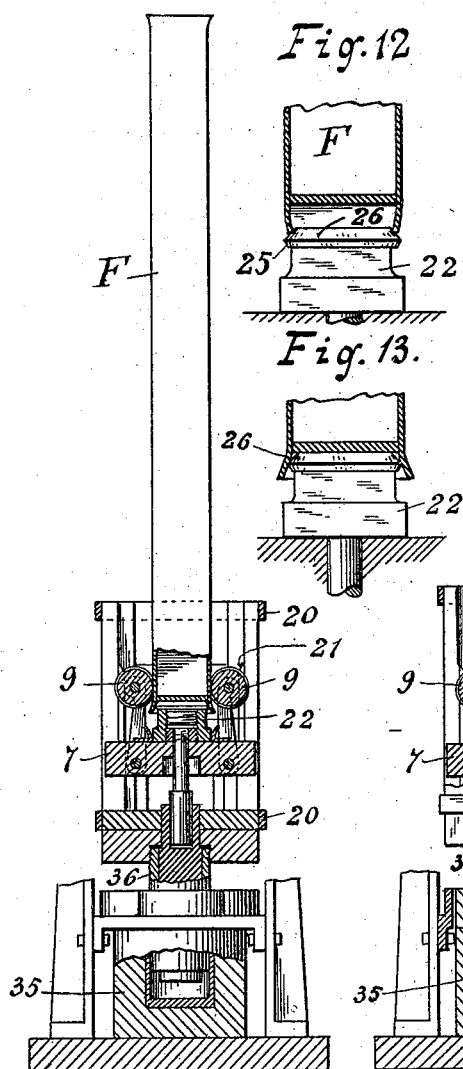
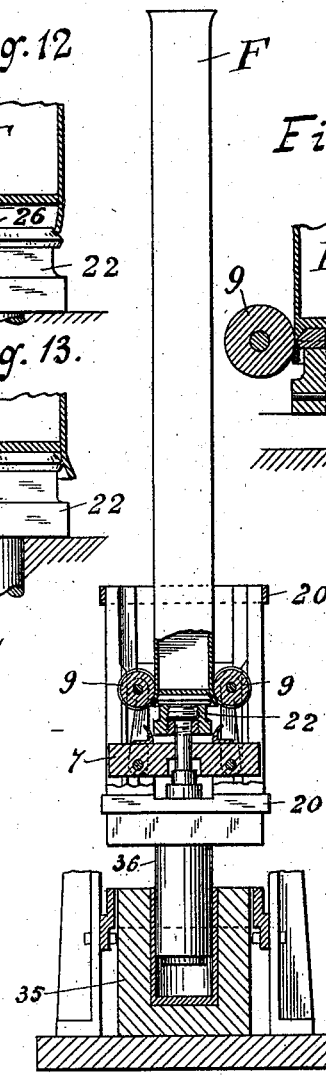
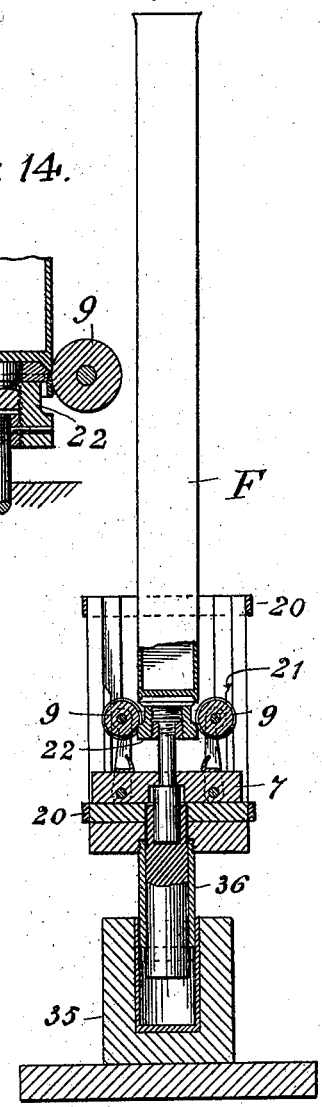
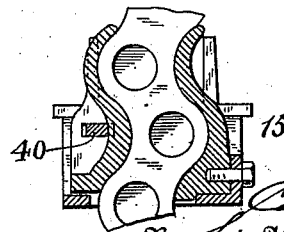
Witnesses
Chas Hanimann
H. Marler
Inventor
Campbell P. Higgins
By his Attorney
Chas W. Forker

UNITED STATES PATENT OFFICE.

CAMPBELL P. HIGGINS, OF NEW YORK, N. Y.

END-WELDING MACHINE FOR HEADERS OR OTHER TUBES.

SPECIFICATION forming part of Letters Patent No. 503,961, dated August 29, 1893.

Application filed July 5, 1892. Serial No. 439,060. (No model.)

*To all whom it may concern:*

Be it known that I, CAMPBELL P. HIGGINS, a citizen of the United States, residing in the city, county, and State of New York, have invented certain new and useful Improvements in End-Welding Machines for Headers or other Tubes, of which the following is a specification.

My invention relates to the manufacture of headers for sectional steam boilers, or to other metallic boxes which are made from a tube of rectangular or other polygonal cross-sectional form.

The object of my invention is to provide an apparatus adapted to automatically weld the end piece to the sides of the box or tube, and also to trim the edges or margins simultaneously with the operation of welding.

My invention consists in a series of welding rolls and means for contracting the same about the end of the header, and also a shearing plate on which the inserted end piece of the header is super-posed; the said plate adapted for passage between the welding rolls in such manner as to sever the surplus metal on the end of the tube beyond the end piece, and of other auxiliary features for moving the header, as hereinafter described and claimed.

Referring to the accompanying drawings in which similar characters of reference indicate corresponding parts throughout the several views: Figure 1, is a side elevation partly in section on the line $x$—$x$, Fig. 2, of the welding machine and crane; Fig. 2, a front elevation partly in section on the line $y$—$y$, Fig. 1, of the welding machine; and Fig. 3, a detached view partly in section, showing the lower end of the header preparatory to welding. Fig. 4, is an enlarged sectional elevation taken on the line $y$—$y$, Fig. 5, showing the preparatory position of insertion of the header into the machine, and also illustrating certain modifications; Fig. 5, a sectional elevation taken on the line $x$—$x$, Fig. 4; also illustrating the preparatory position of operation. Figs. 6, 7 and 8, are sectional views similar to Fig. 5, illustrating consecutively the several remaining positions of operation. Fig. 9, is a horizontal section taken on the line $z$—$z$, Fig. 4. Fig. 10, is a plan view of the welding rolls; and Fig. 11, a horizontal section taken on the line $x'$—$x'$, Fig. 7. Figs. 12, 13 and 14, are detail views illustrating a modified shear plate and successive operations of the same; and Figs. 15, 16 and 17, sectional elevations illustrating the operation of the machine employing such modified plate. Fig. 18, is a detail view showing the draw-box in section.

H, Figs. 1 and 2, represents a suitable frame of the welding machine composed of four vertical standards which support the removable cross-bars I.

E, is the crane, operated by hydraulic cylinder 2, and suspending the header F, upon the trolley 3, adapted to transfer the same, in its vertical position, to and from the welding machine.

15, is the draw-box for supporting the header and resting the same in position upon the cross-bars of the frame H.

J, represents a suitable frame, bearing hydraulic cylinders 4, the rams 5, of which are adapted to hold down the flanges of the draw-box 15, and retain the latter with the header in place preparatory to welding.

7, is a stationary frame connected by bolts 8, to the base of the frame H, and upon the stationary frame 7, are supported the several welding rolls 9, upon the respective sides of the box or header to be welded. The welding rolls 9, are connected to the head 7, by means of links 6, in which the said rolls are pivoted and obtain their lateral movement.

20, is a vertically movable frame guided by the rods 8, and by other suitable guides, which carries the cams 21, that engage with the outer surfaces of the links 6, and so located as to contract the welding rolls 9, during the early part of the upward movement of said frame 20, and to subsequently retain the said rolls in their contracted position when the header F is forced upward through said rolls. The upper head of the frame 20, is adapted to engage with and lift the cross-bars I, at the period of stroke when the rolls 9 have been contracted, and thus draw the header F, upward by means of the draw-box 15, as shown in Fig. 8.

22, is a supporting block which rests on the stationary head 7, previous to operation, and during operation rises independently of, but simultaneously with, the frame 20, acting as a follower which is designed to maintain the end piece 30, in its proper relative position during compression. The block 22, is provided at its upper extremity with a removable core 23, which is designed for header ends having a tube hole wherein such core is adapted to enter and maintain the form of the hole which has been previously punched. In the welding of solid ends, the core 23, is removed from the block 22.

25, Figs. 3, 4, 6 and 14, is the shearing plate, the edges of which extend to a size which will pass the rolls 9, and which serve to shear off the surplus metal of the end of the header when it is welded. This plate may be constructed as shown in Figs. 4 to 8 inclusive, thus adapted to shear the edges flush with the end piece, or such shear may be, and preferably is, constructed as shown in Figs. 1 and 2, and in Figs. 12 to 17 inclusive, wherein the top bevel provided thereto is adapted to obtain an entrance into the contracted end of the header when it is brought to the welding machine in the contracted form shown in Fig. 12. The top bevel 26, of the shear 25, after passage through the rolls, leaves the header end in the form of a sunken panel when finished as shown in Fig. 14. The frame 20, is elevated by the ram 36, of the hydraulic cylinder 35, and the block 22, subsequently raised when the ram 36 engages with the shank 37 thereof; the frame 20, and block 22, thenceforth moving together.

The draw-box 15, may be variously modified. In Fig. 18, I show a sectional view of the draw-box applied to Figs. 1 and 2, which is composed of two parts having curved faces adapted to fit the serpentine contour of the header F; one part being keyed to the flanks of the other by a suitable key 40. In Figs. 4 to 8, inclusive, I indicate a modification of the draw-box 15, wherein it consists of two side plates 41, 41, that are clamped to the flat faces of the header F, and rigidly connected thereto by means of the caps 42, Fig. 5, bolted together, into the tube holes of the header.

The operation of my invention is as follows: The header is taken from the welding fire while suspended on the crane E; the draw-box 15 being detached; and the header with the end to be welded previously placed is dropped into the welding machine with its heated end between the rolls 9, as shown in Fig. 1. Pressure is then applied to the two small cylinders 4, 4, and the rams descend onto the cross-bars I, I, of the frame, as shown in Figs. 1 and 2. Pressure is next applied to the cylinder 35, and the ram 36, raises the frame 20, surrounding the rolls, and with it the four inclined surfaces or cams 21, which act on the links 6, of the welding rolls, force the latter inward against the four sides of the header above the end which is inserted, Figs. 2 and 4. A further movement of the machine engages with the top bars I, I, the same being elevated by the frame 20, which, owing to the predominating pressure applied to the plunger 36, backs up the small rams 5, that have previously retained the draw-box 15, in position. At this period, the block 22, and shearing plate 25 are engaged to rise with the other parts simultaneously while the header is drawn upward through the closed welding rolls 9, thus squeezing down the four sides of the header hard on to the end pieces, and welding the same all round as shown successively in Figs. 4, 6 and 7, the shearing operation taking place simultaneously with said upward movement of the header, Fig. 8, showing the position of the parts at the completion of the operation, which are subsequently retracted to the first position shown in Fig. 1.

Having thus described my invention, what I claim, and desire to secure by Letters Patent, is—

1. In an end welding machine for headers or other tubes, a series of exterior welding rolls with means for moving them inward, a movable frame adapted for connection to the header for drawing it longitudinally between the said rolls, and means for supporting the end piece during its passage between the rolls as set forth.

2. In an end welding machine for headers or other tubes, a series of exterior welding rolls with means for moving them inward, a movable frame adapted to connect with and move the header longitudinally between the said rolls, and a follower for supporting the end piece during its passage between the rolls.

3. In an end welding machine for headers or other tubes, a series of welding rolls, a movable frame adapted to connect with and move the header longitudinally through the said rolls, a follower, and therein a shearing plate substantially as described, adapted to support the end piece and move with the header between the rolls and shear the surplus metal of the tube simultaneously with the welding.

4. In an end welding machine for headers or other tubes, a series of movably supported welding rolls, a movable frame adapted to connect with and move the header longitudinally through the rolls, and upon said frame, the cams or inclined surfaces such as described, adapted to move the welding rolls inward and subsequently retain them in their inward position during the upward motion of said frame.

5. In an end welding machine for headers or other tubes, a series of movably supported welding rolls adapted to surround the end of the header, a drawing frame for moving the rolls inward and drawing the header longitudinally through the same, and a draw-box constructed to be attached to the header and to support it upon the said drawing frame substantially as described.

6. The combination in a machine for end-welding headers or other tubes, of the movably supported welding rolls, the drawing frame having cams with inclined surfaces adapted to move the welding rolls inward, and means for moving the header longitudinally through the rolls, a hydraulic ram for operating the drawing frame, and a follower for advancing the end piece adapted for engagement with the said ram subsequent to the inward movement of the said rolls and simultaneously with the advancement of the header between the same, substantially as described.

7. In a machine for end welding headers or other tubes, the combination of a series of exterior welding rolls, a drawing frame and means for moving the same to move the rolls inward, and to draw the header longitudinally between the rolls, a draw-box constructed to be attached to the header, a stationary support adapted to hold the draw-box in the path of movement of the drawing frame, fluid pressure cylinders and rams therein for holding the draw-box upon the stationary support, and adapted after the welding rolls have been moved inward, to yield to the motion of the drawing frame when the latter abuts on the draw-box, substantially as and for the purpose specified.

CAMPBELL P. HIGGINS.

Witnesses:
  NAT. M. PRATT,
  FRANCIS L. WARD.